(12) United States Patent
Kim et al.

(10) Patent No.: US 8,061,910 B2
(45) Date of Patent: Nov. 22, 2011

(54) MICRO SHUTTER HAVING IRIS FUNCTION, METHOD FOR MANUFACTURING THE SAME, AND MICRO CAMERA MODULE HAVING THE SAME

(75) Inventors: Che-heung Kim, Yongin-si (KR); Woon-bae Kim, Suwon-si (KR); Jong-oh Kwon, Suwon-si (KR); Kyu-dong Jung, Suwon-si (KR)

(73) Assignees: Samsung Electronics Co., Ltd., Suwon-si (KR); Samsung Electro Mechanics Co., Ltd., Suwon-si (KR)

( * ) Notice: Subject to any disclaimer, the term of this patent is extended or adjusted under 35 U.S.C. 154(b) by 213 days.

(21) Appl. No.: 12/134,324

(22) Filed: Jun. 6, 2008

(65) Prior Publication Data

US 2009/0142050 A1      Jun. 4, 2009

(30) Foreign Application Priority Data

Nov. 29, 2007   (KR) .................. 10-2007-0122918

(51) Int. Cl.
*G03B 9/34*      (2006.01)

(52) U.S. Cl. ........................................ 396/481

(58) Field of Classification Search .............. 396/479, 396/480, 481; 359/227, 230, 291
See application file for complete search history.

(56) References Cited

U.S. PATENT DOCUMENTS

| | | | | |
|---|---|---|---|---|
| 3,989,357 | A * | 11/1976 | Kalt | 359/231 |
| 5,233,459 | A * | 8/1993 | Bozler et al. | 359/230 |
| 5,646,770 | A * | 7/1997 | Sato et al. | 359/230 |
| 5,781,331 | A * | 7/1998 | Carr et al. | 359/288 |
| 6,226,116 | B1 | 5/2001 | Dowe et al. | |
| 6,313,937 | B1 * | 11/2001 | Dowe et al. | 359/280 |
| 6,443,637 | B1 * | 9/2002 | Dowe | 396/505 |
| 6,586,738 | B2 * | 7/2003 | Dausch et al. | 250/338.3 |
| 2006/0078331 | A1 * | 4/2006 | Masuda | 396/469 |

FOREIGN PATENT DOCUMENTS

| | | |
|---|---|---|
| JP | 11-72722 A | 3/1999 |
| JP | 11-167078 A | 6/1999 |
| KR | 10-2007-0030871 A | 3/2007 |

* cited by examiner

*Primary Examiner* — Clayton E LaBalle
*Assistant Examiner* — Noam Reisner
(74) *Attorney, Agent, or Firm* — Sughrue Mion, PLLC

(57) ABSTRACT

A micro shutter with an iris function includes a base plate with a transparent portion formed in a circular shape corresponding to an image sensor which allows light to pass through; a plurality of rollup blades which block the light, arranged in a regular polygon at a circumference of the transparent portion on the base plate to cover the transparent portion, and each of the plurality of rollup blades to have a fixing portion fixed to the base plate and a moving portion rolled up toward the fixing portion; and a controller electrically connected with the base plate and the plurality of rollup blades which controls unrolling degrees of the plurality of rollup blades.

27 Claims, 10 Drawing Sheets

MICRO SHUTTER HAVING IRIS FUNCTION, METHOD FOR MANUFACTURING THE SAME, AND MICRO CAMERA MODULE HAVING THE SAME

CROSS-REFERENCE TO RELATED APPLICATIONS

This application claims priority from Korean Patent Application No. 2007-122918 filed Nov. 29, 2007 in the Korean Intellectual Property Office, the disclosure of which is incorporated herein by reference in its entirety.

BACKGROUND OF THE INVENTION

1. Field of the Invention

Apparatus and methods consistent with the present invention relate to an optical shutter, and more particularly, to a micro shutter having an iris function, a method for manufacturing the same, and a micro camera module having the same.

2. Description of the Related Art

As digital technologies advance, portable digital devices such as cell phones, portable game machines, personal digital assistants (PDAs), personal multimedia players (PMPs), digital camcorders, etc. generally have a camera function.

A camera unit disposed in the portable digital devices generally includes a shutter to take a picture as a general camera.

For improving portability thereof, the portable digital devices are required to have as small size as possible. Therefore, the camera unit usable with the portable digital devices generally has an electronic shutter.

However, the camera unit is required to use a mechanical shutter to take a picture having as good quality as the general cameras.

There is a leaf shutter as the mechanical shutter usable with a small camera unit such as the camera unit used in the portable digital devices. However, the related art leaf shutter is limited to reduce a size thereof, and has a slow operating speed. Therefore, it is disadvantages to use the related art mechanical shutter in the portable digital devices due to manufacturing cost and technical problems such as miniaturizing, etc.

Also, when using an iris, an iris unit formed separately from the shutter needs to be disposed in the camera unit so as to limit miniaturizing the camera unit.

SUMMARY OF THE INVENTION

According to an aspect of the present invention, there is provided a micro shutter, which can be formed in a micro size, operate in a high speed, and function as an iris, a method for manufacturing the same, and a micro camera module having the same.

Additional aspects and features of the present invention will be set forth in part in the description which follows and, in part, will be obvious from the description, or may be learned by practice of the general inventive concept.

The foregoing and/or other aspects and features of the present invention can be achieved by providing a micro shutter with an iris function, which includes a base plate with a transparent portion which allows light to pass through; a plurality of rollup blades, which block the light, arranged in a regular polygon at a circumference of the transparent portion on the base plate to cover the transparent portion, and each of the plurality of rollup blades has a fixing portion fixed to the base plate and a moving portion rolled up toward the fixing portion; and a controller electrically connected with the base plate and the plurality of rollup blades which controls unrolling degrees of the plurality of rollup blades.

Each of the plurality of rollup blades may be formed in a triangle thin film shape.

Also, each of the plurality of rollup blades may include; a bottom insulating layer which contacts the base plate; and a top electrode layer formed on the bottom insulating layer; wherein the bottom insulating layer and the top electrode layer have residual stresses different from each other so that the moving portion is rolled up toward the fixing portion.

Also, the top electrode layer may have a tensile residual stress.

Each of the plurality of rollup blades may include an insulating layer which contacts the base plate; and a piezoelectric driving layer formed on the insulating layer.

The piezoelectric driving layer may comprise a first electrode layer, a piezoelectric layer, and a second electrode layer, and a voltage is applied to the first electrode layer or the second electrode layer so that a piezoelectric driving force is generated in the piezoelectric driving layer, and an electrostatic force is generated between the piezoelectric driving layer and the base plate.

Each of the plurality of rollup blades may include a piezoelectric driving layer which contacts the base plate; and an insulating layer formed on the piezoelectric driving layer.

Two nearby rollup blades of the plurality of rollup blades may partially overlap each other.

Also, the plurality of rollup blades may comprise at least two layers.

Each of the plurality of rollup blades may include a plurality of pleats formed perpendicularly to a rolling direction.

The base plate may include: a transparent substrate; and a transparent electrode disposed on the transparent substrate.

The transparent substrate may include at least one optical element.

The controller may control the unrolling degrees of the plurality of rollup blades by at least three steps.

The controller may control the unrolling degrees of the plurality of rollup blades using a magnetic force.

The micro shutter with an iris function may further include a cover disposed over the plurality of rollup blades on the base plate.

The foregoing and/or other aspects and features of the present invention can also be achieved by providing a micro shutter with an iris function, which include: a base plate with a transparent portion which allows light to pass through; a pair of rollup blades which block the light arranged to face each other at opposite sides of the transparent portion on the base plate, and each of the pair of rollup blades to have a fixing portion fixed to the base plate and a moving portion rolled up toward the fixing portion; and a controller electrically connected with the base plate and the pair of rollup blades which controls unrolling degrees of the pair of rollup blades.

The transparent portion may be formed corresponding to an image sensor

The controller may control the pair of rollup blades to form a slit and the slit moves from one side of the transparent portion to the opposite side thereof The foregoing and/or other aspects and features of the present invention can also be achieved by providing a micro camera module, which includes: an image sensor; a base plate disposed above the image sensor, the base plate having a transparent portion which allows light to pass through formed corresponding to the image sensor; at least one rollup blade, which blocks the light; and a controller electrically connected with the base plate and the at least one rollup blade which controls an unrolling degree of the at least one rollup blade, wherein the at least one rollup blade has a fixing portion fixed to a side of the transparent portion on the base plate and a moving portion that has a shape corresponding to the transparent portion and is rolled up toward the fixing portion.

The transparent portion may have a circular shape, and the at least one rollup blade comprises a plurality of rollup blades arranged in a regular polygon to cover the transparent portion at a circumference of the transparent portion.

Also, each of the rollup blades may form a triangle.

The rollup blade may include a bottom insulating layer which contacts the base plate; and a top electrode layer disposed on the bottom insulating layer having a tensile stress.

The foregoing and/or other aspects and features of the present invention can also be achieved by providing a method for manufacturing a micro shutter with an iris function, which includes forming a transparent electrode layer on a transparent substrate; forming a sacrificial layer corresponding to a transparent portion on the transparent electrode layer; forming an insulating layer in a shape corresponding to a rollup blade on the sacrificial layer and the transparent electrode layer; forming a thin electrode layer on the insulating layer; and removing the sacrificial layer.

The insulating layer and the electrode layer may be formed to have residual stresses different from each other.

The foregoing and/or other aspects and features of the present invention can also be achieved by providing a micro shutter with an iris function, which includes a transparent portion which allows the light to pass through; at least one rollup blade which blocks the light passed through the transparent portion; and a controller which electrically controls an unrolling degree of the at least one rollup blade.

The foregoing and/or other aspects and utilities of the present general inventive concept can also be achieved by providing.

BRIEF DESCRIPTION OF THE DRAWINGS

These and/or other aspects and features of the present invention will become apparent and more readily appreciated from the following description of the exemplary embodiments, taken in conjunction with the accompanying drawings of which.

DETAILED DESCRIPTION OF THE EXEMPLARY EMBODIMENTS

Figure 1A:
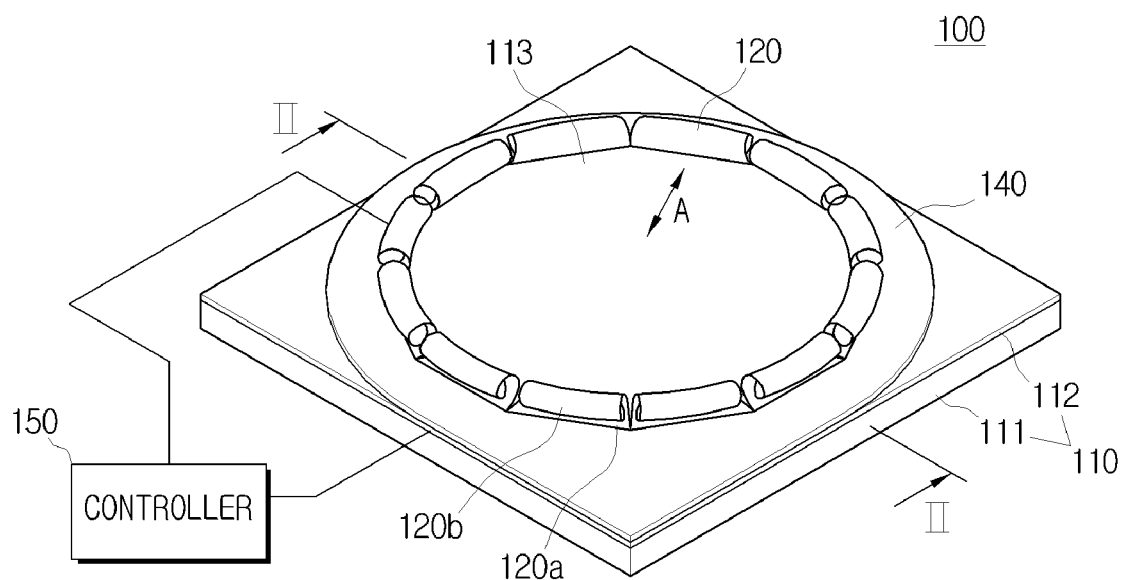
FIG. 1A is a perspective view illustrating a micro shutter with an iris function according to a first exemplary embodiment of the present invention in opened state.

Reference will now be made in detail to the exemplary embodiments of the present invention, examples of which are illustrated in the accompanying drawings, wherein like reference numerals refer to the like elements throughout. The exemplary embodiments are described below in order to explain the present invention by referring to the figures.

The matters defined in the description, such as a detailed construction and elements thereof, are provided to assist in a comprehensive understanding of the present invention. Thus, it is apparent that the present inventive concept may be carried out without those defined matters. Also, well-known functions or constructions are omitted to provide a clear and concise description of exemplary embodiments herein.

Figure 1B:
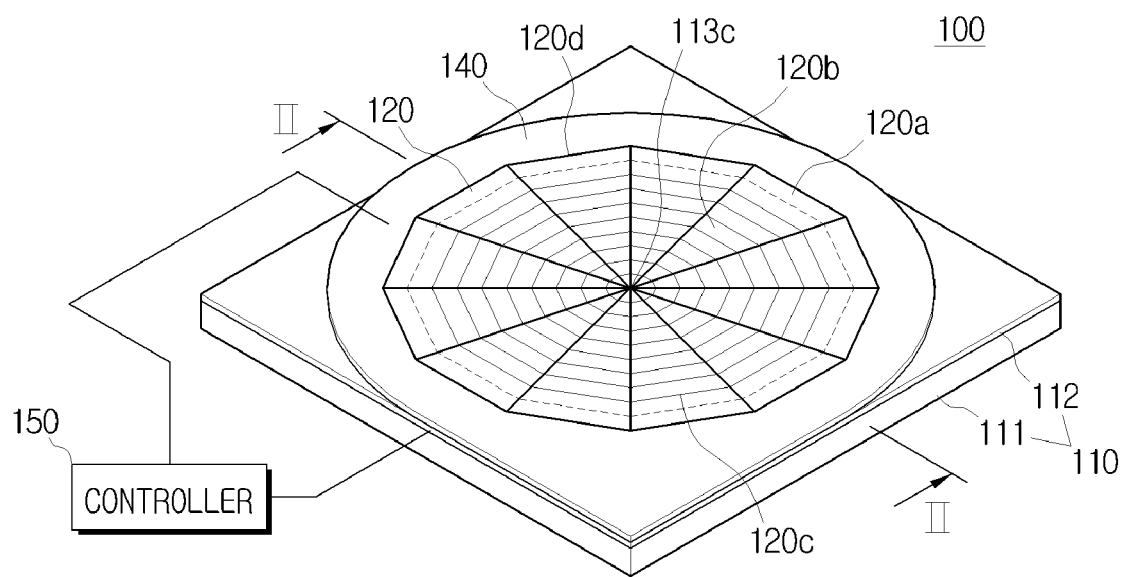
FIG. 1B is a perspective view illustrating the micro shutter with an iris function of FIG. 1A to exclude light.
Figure 1C:
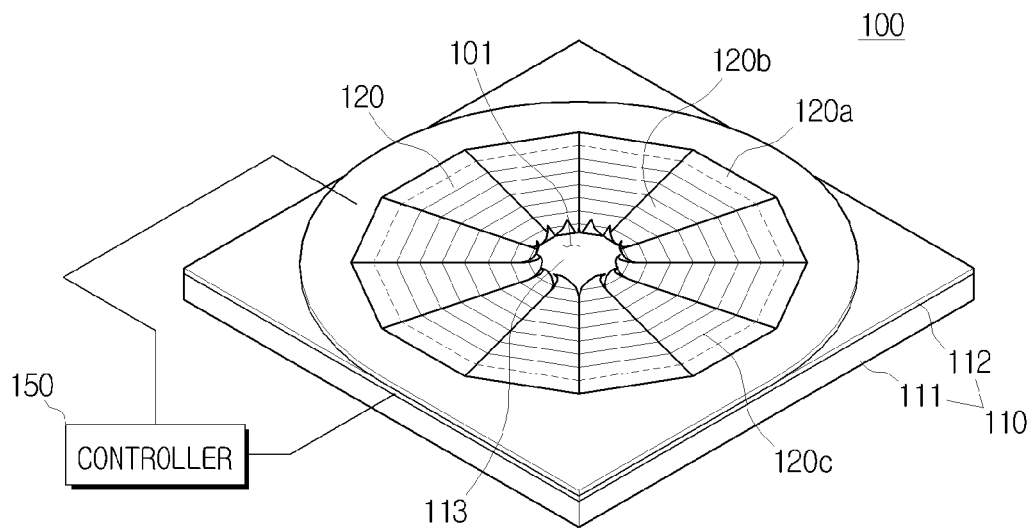
FIG. 1C is a perspective view illustrating the micro shutter with an iris function of FIG. 1A to form an iris.
Figure 2A:
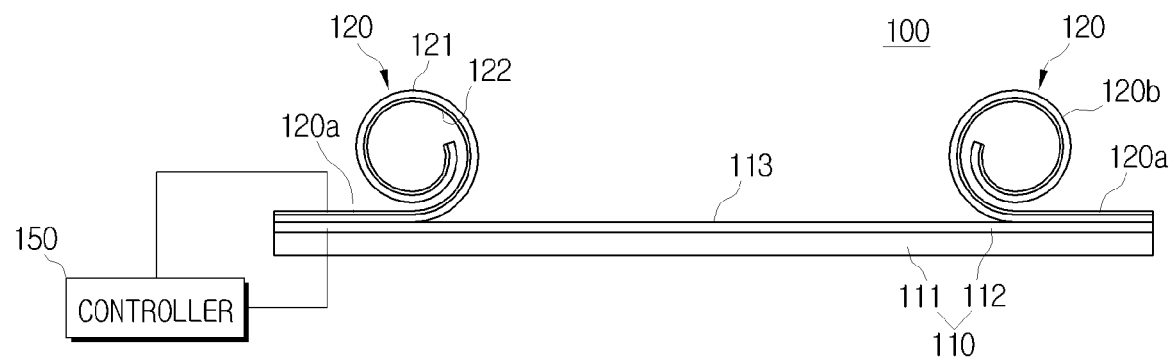
FIGS. 2A and 2B are sectional views illustrating the micro shutter with an iris function of FIGS. 1A and 1B taken along a line II-II in FIGS. 1A and 1B, respectively.
Figure 2B:
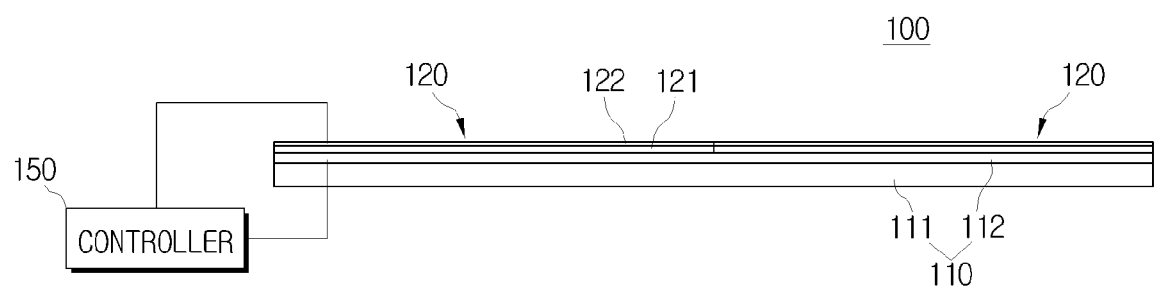

FIG. 1A is a perspective view illustrating a micro shutter with an iris function according to a first exemplary embodiment of the present invention in an opened state. FIG. 1B is a perspective view illustrating the micro shutter with an iris function of FIG. 1A to exclude light. FIG. 1C is a perspective view illustrating the micro shutter with an iris function of FIG. 1A to form an iris. FIGS. 2A and 2B are sectional views illustrating the micro shutter with an iris function of each of FIGS. 1A and 1B taken along a line II-II in FIGS. 1A and 1B, respectively;

Referring to FIGS. 1A, 1B, 1C, 2A and 2B, the micro shutter with an iris function 100 according to the first exemplary embodiment of the present invention includes a base plate 110, a plurality of rollup blades 120, and a controller 150.

Referring to FIGS. 1A and 2A, the base plate 110 includes a transparent substrate 111 through which light can pass, and a transparent electrode 112 formed on a top surface of the transparent substrate 111. A transparent portion 113 is formed on a top surface of the transparent electrode 112. In this exemplary embodiment, the transparent portion 113 is formed substantially in a circular shape. However, the transparent portion 113 may be formed in various shapes such as a circle, a triangle, an ellipse, a trapezoid, a polygon, an atypical closed figure, etc. Also, an opaque portion 140 may be formed outside the transparent portion 113 on the top surface of the transparent electrode 112 to prevent the light from passing through. The opaque portion 140 may be formed of an optical opaque material to prevent visible rays or light from passing therethrough. Alternatively, no opaque portion 140 may be formed outside the transparent portion 113 on the transparent electrode 112. In this case, other elements of the camera module in which the micro shutter 100 is assembled may be configured to prevent the light from passing through the outside of the transparent portion 113.

The transparent substrate 111 may be formed of a material such as glass, quartz, plastic, silica, etc. The transparent electrode 112 may be formed of a material such as indium tin oxide (ITO), ZnO, $SnO_2$, carbon nanotube (CNT), conductive polymer, etc. The opaque portion 140 may be formed of chromium (Cr). The opaque portion may also be formed of optical black materials.

The plurality of rollup blades 120 may be formed to selectively cover the transparent portion 113 of the base plate 110, so prevent the light from passing through the transparent portion 113. That is, when no driving force is applied to the plurality of rollup blades 120, each of the rollup blades 120 remains in a rolled up state as illustrated in FIG. 1A. When the driving force is applied, each of the plurality of rollup blades 120 is unrolled to cover the transparent portion 113 as illustrated in FIG. 1B, thereby preventing the light from passing through the transparent portion 113. Each of the plurality of rollup blades 120 is formed in two layers 121 and 122 as illustrated in FIGS. 2A and 2B, and includes a fixing portion 120a, which is fixed to the base plate 110 at a side of the transparent portion 113, and a moving portion 120b rolled up toward the fixing portion 120a. That is, the rollup blade 120 is formed in a thin film shape corresponding to a shape of the transparent portion 113, and includes a bottom insulating layer 121 to contact the base plate 110 and a top electrode layer 122 formed on a top surface of the bottom insulating layer 121. Therefore, the plurality of rollup blades 120 may be formed in a shape corresponding to a shape of the transparent portion 113. That is, the plurality of rollup blades 120 may be formed in one of various shapes such as a circle, a triangle, an ellipse, a trapezoid, a polygon, an atypical closed figure, etc. corresponding to the shape of the transparent portion 113. The bottom insulating layer 121 of each of the plurality of rollup blades 120 contacts the transparent portion 113 of the base plate 110.

In this embodiment, the plurality of rollup blades 120 is disposed outside the circular transparent portion 113, that is, at a circumference of the circular transparent portion 113. The plurality of rollup blades 120 is disposed to form a regular polygon to enclose the circular transparent portion 113 as illustrated in FIG. 1B, thereby covering completely the circular transparent portion 113. Therefore, each of the plurality of rollup blades 120 may be formed in a triangle with an apex forming a center 113c of the transparent portion 113. As illustrated in FIG. 1B, the base 120d of the triangle forming one rollup blade 120 is located at each side of the polygon. Therefore, a portion near the base 120d of the rollup blade 120 forms the fixing portion 120a fixed to the base plate 110, and the other portion of the rollup blade 120 forms the moving portion 120b that is rolled up or unrolled to selectively cover the transparent portion 113. In this exemplary embodiment, as illustrated in FIGS. 1B and 1C, the plurality of rollup blades 120 forms a regular dodecagon. As the regular polygon has more sides, an iris opening 101 formed by the plurality of rollup blades 120 becomes more and more like a circle.

Furthermore, the rollup blade 120 may have a plurality of pleats 120c formed at the moving portion 120b so that the rollup blade 120 can be rolled up in a predetermined direction. The plurality of pleats 120c may be formed at the moving portion 120b of the rollup blade 120 perpendicularly to a direction in which the rollup blade 120 is rolled up and unrolled (arrow A of FIG. 1A) so that the rollup blade 120 is rolled up as illustrated in FIG. 1A.

Figure 3A:
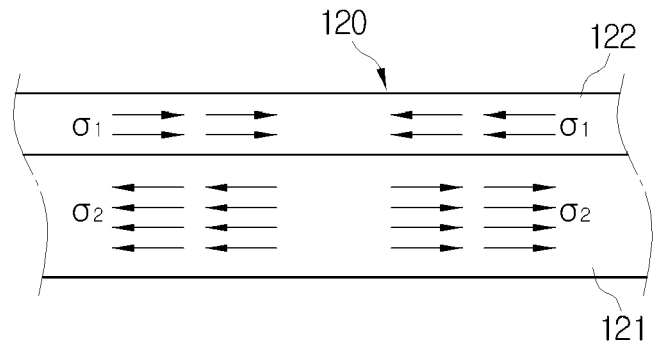
FIG. 3A is a partial sectional view illustrating a residual stress distribution of a rollup blade of a micro shutter with an iris function according to an exemplary embodiment of the present invention.
Figure 3B:
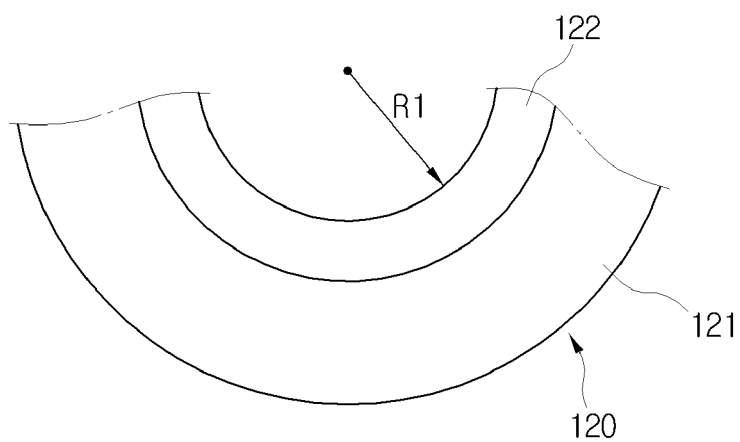
FIG. 3B is a partial sectional view illustrating a bending of the rollup blade with the residual stress distribution of FIG. 3A.

The bottom insulating layer 121 and the top electrode layer 122 of the rollup blade 120 have residual stresses different from each other so that when the driving force is not applied to, the moving portion 120b of the rollup blade 120 remains in the rolled up state. FIG. 3A illustrates an example of the residual stress distribution of the rollup blade 120. Referring to FIG. 3A, the top electrode layer 122 has a tensile residual stress, and the bottom insulating layer 121 has a compressive residual stress. Therefore, when the driving force is not applied to the top electrode layer 122, the top electrode layer 122 receives a force $\sigma_1$ in a compressive direction due to the tensile residual stress, and the bottom insulating layer 121 receives a force $\sigma_2$ in a tensile direction due to the compressive residual stress. As a result, the rollup blade 120 is rolled above the top electrode layer 122 so that the top electrode layer 122 is bent concavely as illustrated in FIG. 3B. R1 in FIG. 3B represents a curvature radius of the top electrode layer 122 of the rollup blade 120 bent concavely.

Figure 4A:
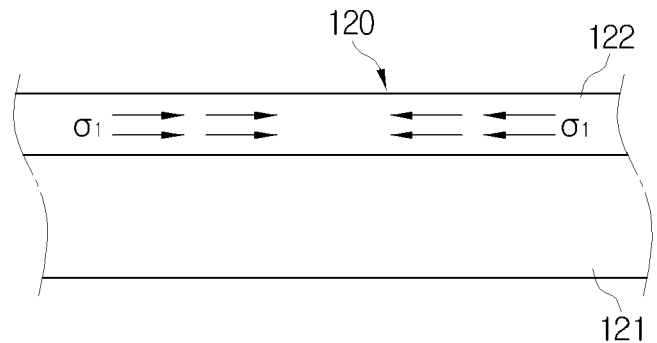
FIGS. 4A and 4B are partial sectional views illustrating rollup blades of a micro shutter with an iris function according to an exemplary embodiment of the present invention having a different residual stress distribution.

Also, as illustrated in FIG. 4A, when the top electrode layer 122 of the rollup blade 120 has the tensile residual stress and the bottom insulating layer 121 thereof has no residual stress, the top electrode layer 122 only receives a force $\sigma_1$ in the compressive direction due to the tensile residual stress so that the rollup blade 120 is bent concavely above the top electrode layer 122. In this case, the curvature radius R2 of the top electrode layer 122 is larger than R1.

Figure 4B:
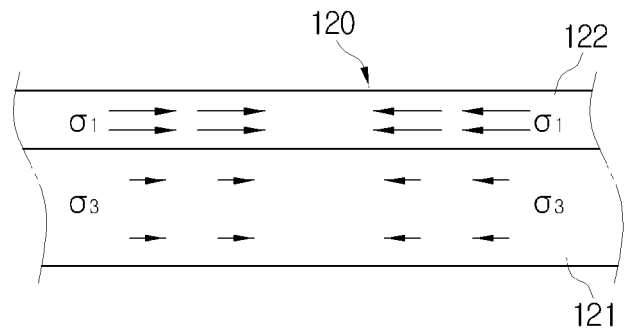

Furthermore, as illustrated in FIG. 4B, when the top electrode layer 122 of the rollup blade 120 has the tensile residual stress and the bottom insulating layer 121 thereof has a tensile residual stress less than the tensile residual stress of the top electrode layer 122, the compressive force $\sigma_1$ applied to the top electrode layer 122 is larger than the compressive force $\sigma_3$ applied to the bottom insulating layer 121 so that the rollup blade 120 is bent concavely above the top electrode layer 122. In this case, the curvature radius R3 of the top electrode layer 122 is larger than R2.

Therefore, in the rollup blades 120 used in this embodiment, the residual stress of the top electrode layer 122 and the residual stress of the bottom insulating layer 121 may be controlled to adjust the curvature of the moving portion 120b of the rollup blade 120. When the moving portion 120b of the rollup blade 120 is formed to have a small curvature radius, the rollup blade 120 may be rolled up more than one turn as illustrated in FIGS. 1A and 2A. Therefore, the height of the micro shutter 100 may be lowered.

The bottom insulating layer 121 of the rollup blade 120 may be formed of a material such as PECVD, $Si_3N_4$, $SiO_2$, parylene, etc. The top electrode layer 122 of the rollup blade 120 may be formed of a material such as Cr, Al, Au, Mo, Cu, etc. Also, at least one of the bottom insulating layer 121 and the top electrode layer 122 of the rollup blade 120 may be formed of a material having an optical black property to exclude the visible rays or the light.

Figure 5A:
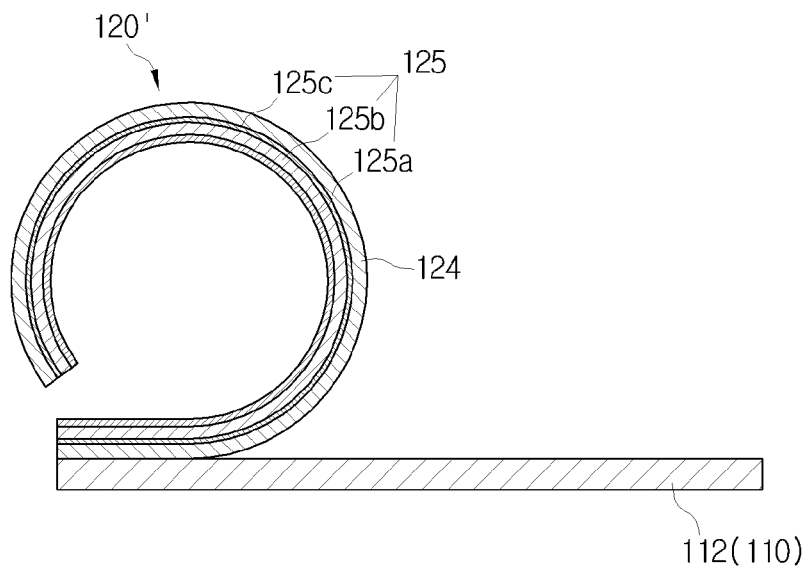
FIGS. 5A and 5B are partial sectional views illustrating an example of a rollup blade usable with a micro shutter with an iris function according to an exemplary embodiment of the present invention.
Figure 5B:
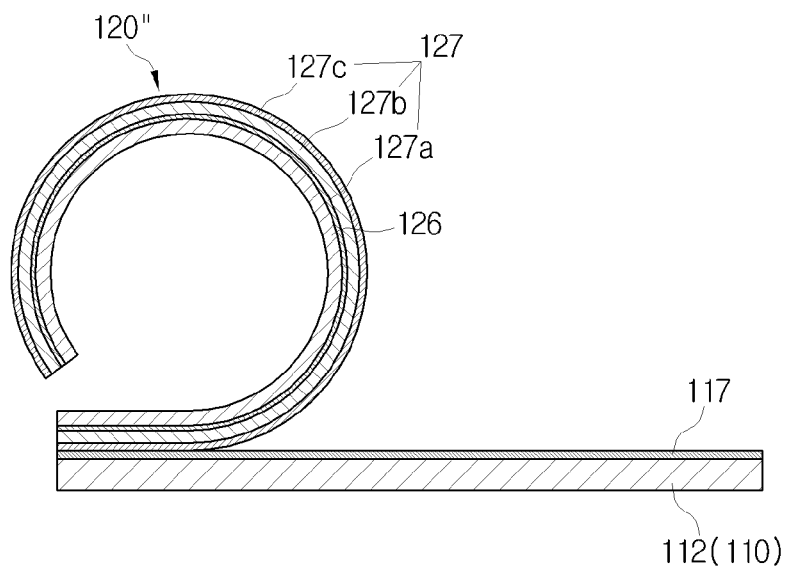

Other examples of the rollup blades 120' and 120" are illustrated in FIGS. 5A and 5B. The rollup blade 120' and 120" illustrated in FIGS. 5A and 5B has two layers, and one of the two layers is formed of a piezoelectric driving layer 125 and 127.

The rollup blade 120' illustrated in FIG. 5A has an insulating layer 124 at a bottom portion thereof and the piezoelectric driving layer 125 formed on a top surface of the insulating layer 124. The bottom insulating layer 124 of the rollup blade 120' has a compressive residual stress, and the top piezoelectric driving layer 125 thereof has a tensile residual stress so that the rollup blade 120' can be rolled upwardly. The rollup blade 120" illustrated in FIG. 5B has a piezoelectric driving layer 127 at a bottom portion thereof, and an insulating layer 126 formed on a top surface of the piezoelectric driving layer 127. The bottom piezoelectric driving layer 127 of the rollup blade 120" has a compressive residual stress, and the top insulating layer 126 thereof has a tensile residual stress so that the rollup blade 120" can be rolled upwardly. Here, the piezoelectric driving layer 125 and 127 is configured of a layer structure consisting of a first electrode layer 125a and 127a, a piezoelectric layer 125b and 127b, and a second electrode layer 125c and 127c. Therefore, a transparent base insulating layer 117 is formed on the transparent electrode 112 of the base plate 110, which the rollup blade 120" illustrated in FIG. 5B contacts, to prevent the second electrode layer 127c of the piezoelectric driving layer 127 from contacting the transparent electrode 112.

A voltage is applied to the electrode layer 125c and 127c of the piezoelectric driving layer 125 and 127 of the rollup blade 120' and 120" nearest the transparent electrode 112 of the base plate 110 so as to generate an electrostatic force to unroll the rollup blade 120' and 120". That is, the electrode layer 125c and 127c nearer the transparent electrode 112 of the two electrode layers 125a, 125c, 127a, and 127c is used as an electrode to generate the electrostatic force between the electrode layer 125c and 127c and the transparent electrode 112, and to generate a piezoelectric driving force between the electrode layer 125c and 127c and the other electrode layer 125a and 127a of the piezoelectric driving layer 125 and 127.

For example, when the piezoelectric driving layer 125 is on the top surface of the insulating layer 124 as illustrated in FIG. 5A, the voltage is applied to the transparent electrode 112, the first electrode layer 125a, and the second electrode layer 125c so that the electrostatic force is generated between the second electrode layer 125c of the piezoelectric driving layer 125 and the transparent electrode 112 of the base plate 110, and the piezoelectric driving force is generated between the first electrode layer 125a and the second electrode layer 125c of the piezoelectric driving layer 125. For example, +5V voltage is applied to the second electrode layer 125c of the piezoelectric driving layer 125, and the transparent electrode 112 and the first electrode layer 125a are set for 0V. When the above voltage is applied to the piezoelectric driving layer 125 and the transparent electrode 112, the electrostatic force is generated between the transparent electrode 112 and the second electrode layer 125c, and the piezoelectric driving force is generated between the first electrode layer 125a and the second electrode layer 125c so that the rollup blade 120' is driven at the same time by the piezoelectric driving force and the electrostatic force. In the above explanation, the voltage applied to the transparent electrode 112, the first electrode layer 125a, and the second electrode layer 125c is only exemplary and not intended to be limiting. The voltage can be applied to them in various methods.

Also, when the piezoelectric driving layer 127 is under the insulating layer 126 as illustrated in FIG. 5B, the voltage is applied to the transparent electrode 112, the first electrode layer 127a, and the second electrode layer 127c so that the electrostatic force is generated between the second electrode layer 127c of the piezoelectric driving layer 127 and the transparent electrode 112, and the piezoelectric driving force is generated between the first electrode layer 127a and the second electrode layer 127c of the piezoelectric driving layer 127. When one electrode layer 125c and 127c of the piezoelectric driving layer 125 and 127 is used as an electrode for the electrostatic driving as described above, the piezoelectric driving force and the electrostatic force may be used at the same time to control an unrolling degree of the rollup blade 120' and 120".

As described above, if the rollup blade 120' and 120" is configured to have the piezoelectric driving layer 125 and 127, the electrostatic force operating between the rollup blade 120' and 120" and the transparent electrode 112 and the piezoelectric driving force of the piezoelectric driving layer 125 and 127 can be used to unroll the rollup blade 120' and 120". Therefore, the size of the voltage to operate the rollup blade 120' and 120" may be decreased.

Referring to FIGS. 1A, 1B, 1C, 2A and 2B again, the controller 150 applies a predetermined voltage to the top electrode layer 122 of each of the plurality of rollup blades 120 and to the transparent electrode 112 of the base plate 110 so that the moving portions 120b of the rollup blades 120 are unrolled to contact the transparent portion 113. The controller 150 may control the size of the voltage applied to the plurality of rollup blades 120 and the base plate 110 so that the controller 150 can control the unrolling degree of the moving portion 120b of each of the rollup blades 120 in various steps. The area of the transparent portion 113 through which the light can pass changes corresponding to the unrolling degree of the moving portion 120b of the rollup blade 120 so that the amount of the light passing through the transparent portion 113 changes corresponding to the unrolling degree of the moving portion 120b of the rollup blade 120. Therefore, the plurality of rollup blades 120 can function as an iris.

Hereinafter, operation of the micro shutter 100 with an iris function according to the first embodiment of the present general inventive concept will be explained in detail with reference to FIGS. 1A 1B, 1C, 2A and 2B.

When the controller 150 does not apply the voltage to the plurality of rollup blades 120, the rollup blades, as illustrated in FIGS. 1A and 2A, remain in the state that the moving portion 120b thereof is rolled up above the fixing portion 120a thereof. The transparent portion 113 of the base plate 110 is completely opened so that the maximum amount of the light passes through the transparent portion 113.

When the controller 150 receives a shutter operating signal in this state, the controller 150 applies a shutter voltage to the top electrode layer 122 of each of the plurality of rollup blades 120 and the transparent electrode 112 of the base plate 110. When the shutter voltage is applied to between the plurality of rollup blades 120 and the transparent electrode 112, the moving portions 120b of the rollup blades 120 are gradually unrolled by the electrostatic force generated between the moving portions 120b of the rollup blades 120 and the transparent electrode 112 to cover the transparent portion 113 as illustrated in FIGS. 1B and 2B. When the moving portions 120b of the plurality of rollup blades 120 completely cover the transparent portion 113 of the base plate 110, the light is excluded. Here, the shutter voltage refers to the size of the voltage capable of unrolling completely the moving portions 120b of the plurality of rollup blades 120 to closely contact the transparent portion 113.

When the controller 150 shuts off the shutter voltage to be applied to the plurality of rollup blades 120, the moving portions 120b of the plurality of rollup blades 120 are rolled up by themselves in the counterclockwise direction due to the residual stresses thereof, and are located above the fixing portions 120a thereof as illustrated in FIGS. 1A and 2A. As a result, the transparent portion 113 of the base plate 110 is opened so that the light can pass through the opened transparent portion 113.

Furthermore, when the micro shutter 100 according to the exemplary embodiment of the present invention is used as an iris, the controller 150 applies a voltage less than the shutter voltage between the top electrode layers 122 of the plurality of rollup blades 120 and the transparent electrode 112. When the voltage is applied between the plurality of rollup blades 120 and the transparent electrode 112, the moving portions 120*b* of the rollup blades 120, as illustrated in FIG. 1C, cover some of the transparent portion 113 corresponding to the size of the applied voltage so as to form a substantially circular iris opening 101 at a center thereof The light passes through the transparent portion 113 via the iris opening 101. The controller 150 controls the size of the voltage applied to the plurality of rollup blades 120 to adjust the size of the iris opening 101. Therefore, the controller 150 can control the amount of the light to pass through the transparent portion 113. Also, the controller 150 may control the size of the voltage applied to the plurality of rollup blades 120 to adjust the unrolling degrees of the plurality of rollup blades 120 in at least three steps, that is, a first step in which the rollup blades 120 are completely rolled up, a second step in which the rollup blades 120 are partially unrolled, and a third step in which the rollup blades 120 are completely unrolled.

The micro shutter 100 with an iris function according to the first exemplary embodiment of the present invention has the plurality of rollup blades 120 formed in a thin film shape so that the micro shutter 100 can be driven by a low electric power. Therefore, the consumption of the electric power is decreased, and the control thereof is easy. Also, the thin film rollup blade 120 has a small inertial mass so that the rollup blades 120 can operate at a high speed. If the plurality of rollup blades 120 is arranged in a regular polygon shape, the plurality of rollup blades 120 can form the iris opening 101 similar to a circular shape.

In the above description, the electrostatic force is used as the driving force to adjust the unrolling degree of the rollup blade 120. Alternatively, a magnetic force may be used as the driving force to adjust the unrolling degree of the rollup blade 120. The rollup blades 120 and the base plate 110 may be configured so that the magnetic force is selectively generated therebetween.

Figure 6:
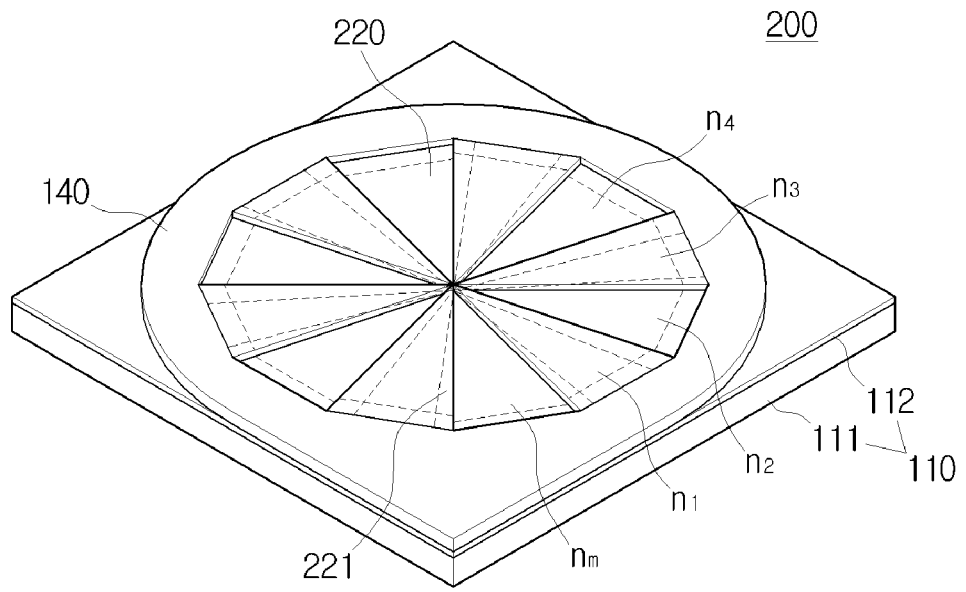
FIG. 6 is a perspective view illustrating a micro shutter with an iris function according to an exemplary embodiment of the present invention having a plurality of rollup blades to be overlapped with each other.

As illustrated in FIG. 6, the micro shutter 200 according to the exemplary embodiment of the present invention may have the plurality of rollup blades 220 whose two nearby rollup blades 220 are partially overlapped with each other. The plurality of rollup blades 220 may be formed in multi-layers. For example, odd rollup blades n1 and n3 of the plurality of rollup blades 220 are formed in a first layer, and even rollup blades n2 and n4 thereof are formed in a second layer. As illustrated in FIG. 6, portions 221 near both sides of the rollup blades 220 formed in the first and second layers are overlapped with each other so that the light is prevented from passing through between two nearby rollup blades 220.

Alternatively, although not illustrated in FIG. 6, the plurality of rollup blades 220 may be formed in three layers, that is, a first layer consisting of the odd rollup blades thereof, a second layer consisting of the even rollup blades thereof, and a third layer consisting of a center covering rollup blade (not illustrated) to cover a center at which the apexes of the plurality of rollup blades 220 are gathered. Furthermore, the plurality of rollup blades 220 may be formed so that each of the rollup blades 220 forms a layer different from the other rollup blades 220.

Figure 7A:
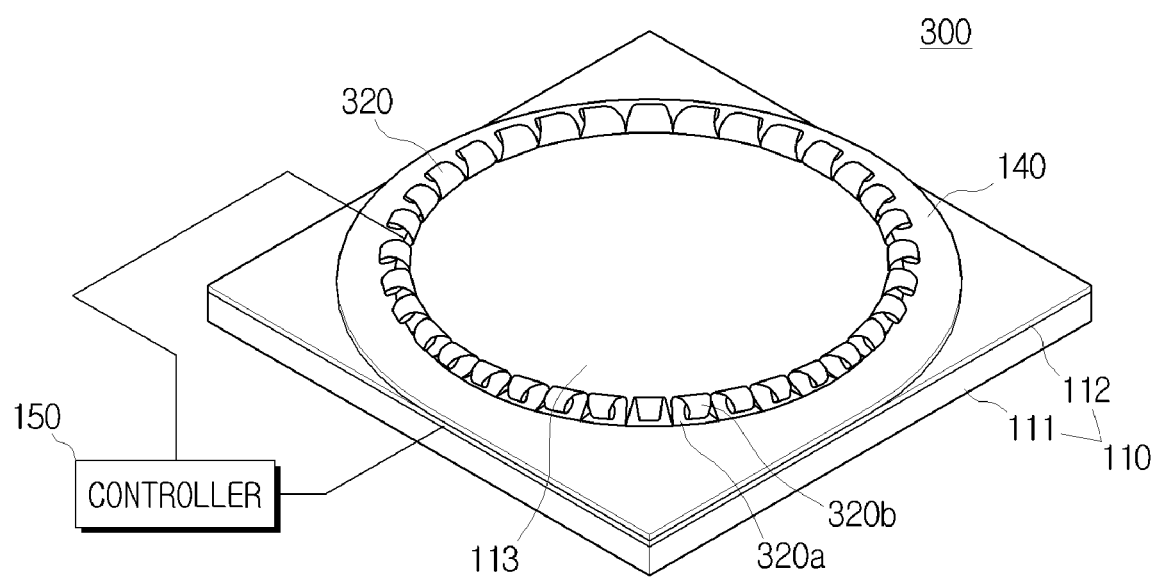
FIGS. 7A to 7C are perspective views illustrating operation of a micro shutter with an iris function according to a second exemplary embodiment of the present invention.
Figure 7B:
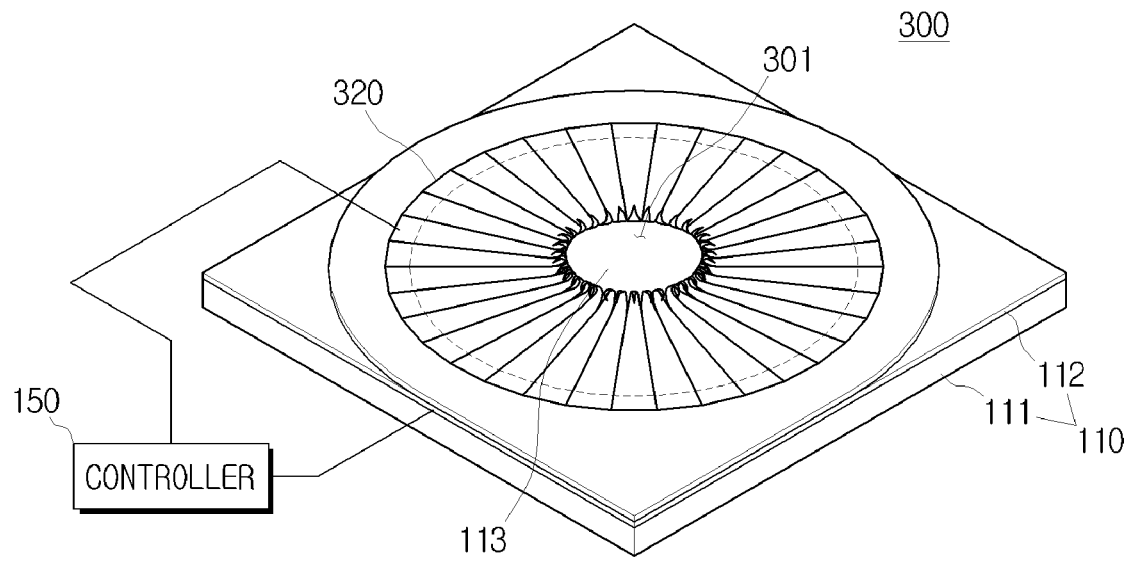
Figure 7C:
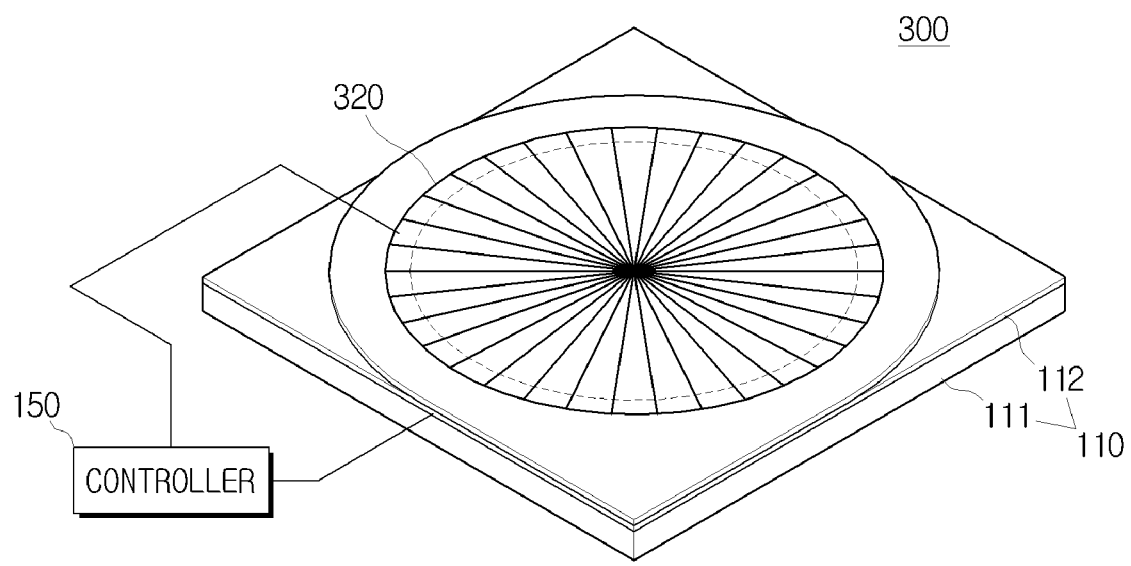

FIGS. 7A to 7C illustrates the micro shutter 300 with an iris function according to a second exemplary embodiment of the present invention having 24 rollup blades 320. That is, the plurality of rollup blades 320 is arranged in a regular icosi- kaitetragon (or "icositetragon"). In FIG. 7A, the transparent portion 113 of the base plate 110 is opened. In FIG. 7C, the plurality of rollup blades 320 covers the transparent portion 113 to exclude the light. In FIG. 7B, a voltage less than the shutter voltage is applied to the plurality of rollup blades 320 so that the rollup blades 320 form an iris opening 301 with a smaller diameter than that of the completely opened transparent portion 113. The iris opening 301 of FIG. 7B is more similar to a circular shape than the iris opening 101 of FIG. 1C. The structure of each of the plurality of rollup blades 320 is substantially the same as the rollup blades 120 of the micro shutter 100 according to the first embodiment of the present general inventive concept; therefore, a detail explanation thereof is not repeated.

The controller 150 applies a voltage to the plurality of rollup blades 320 to control the unrolling degrees of the rollup blades 320 in various steps. When the controller 150 applies the shutter voltage to the plurality of rollup blades 320, all the rollup blades 320 are unrolled to cover the circular transparent portion 113, thereby blocking the light. When the controller 150 shuts off the shutter voltage, a moving portion 320*b* of each of the plurality of rollup blades 320 is rolled upwardly by itself, and then, is located above a fixing portion 320*a* thereof Therefore, the transparent portion 113 of the base plate 110 is completely opened.

When the controller 150 applies the voltage less than the shutter voltage to the plurality of rollup blades 320, the plurality of rollup blades 320 forms the iris opening 301 at the center of the transparent portion 113 as illustrated in FIG. 7B. Therefore, the light passes through the transparent portion 113 via the iris opening 301. The controller 150 controls the size of the voltage applied to the plurality of rollup blades 320 so that the size of the iris opening 301 changes almost linearly. As a result, the micro shutter 300 according to the exemplary embodiment of the present invention can be used as an iris.

Figure 8A:
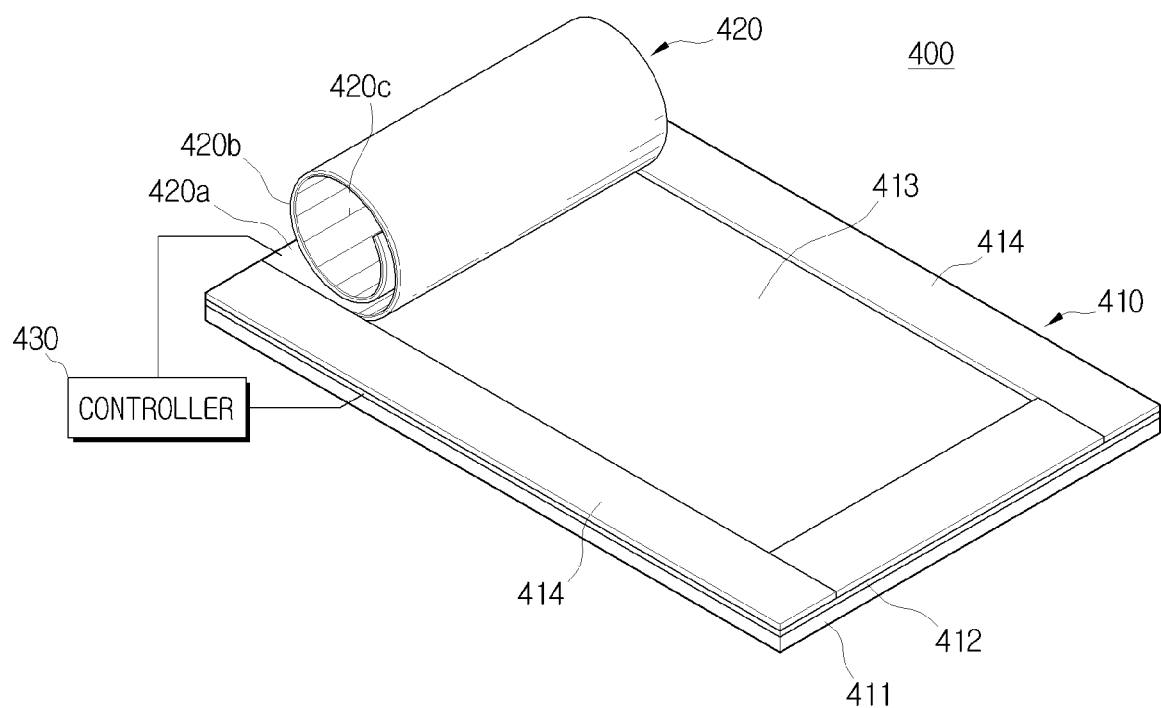
FIGS. 8A to 8B are perspective views illustrating operation of a micro shutter with an iris function according to a third exemplary embodiment of the present invention.
Figure 8B:
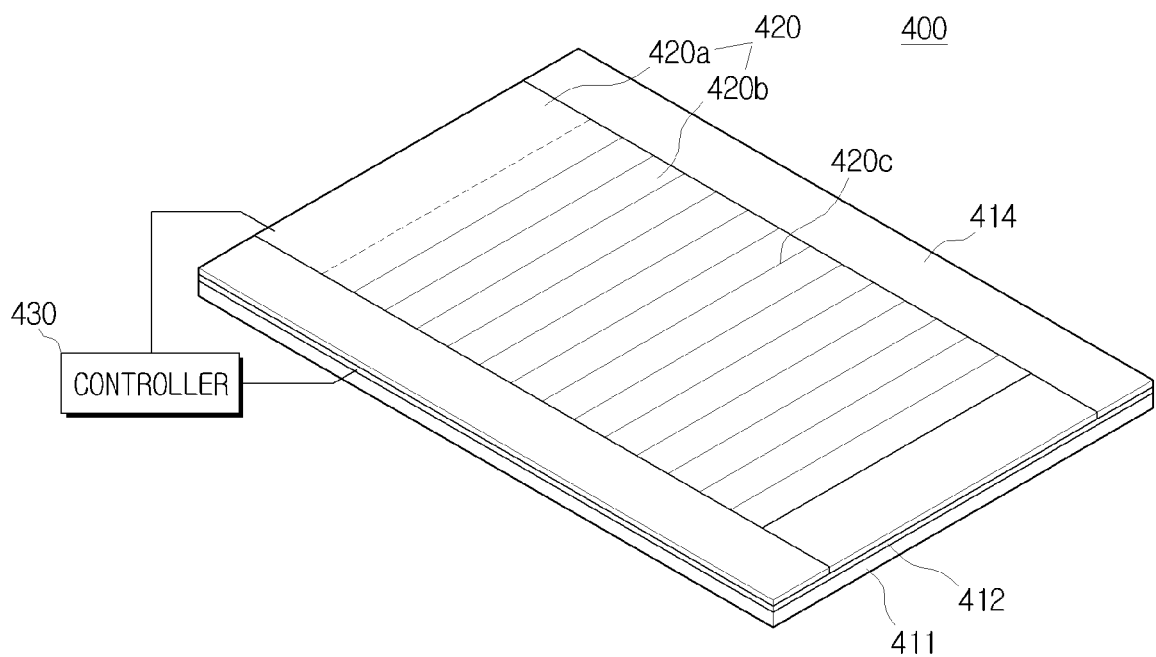

FIGS. 8A and 8B are perspective views illustrating a micro shutter 400 with an iris function according to a third exemplary embodiment of the present general inventive concept.

Referring to FIGS. 8A and 8B, the micro shutter 400 with an iris function according to a third embodiment of the present general inventive concept includes a base plate 410, a rollup blade 420, and a controller 430.

The base plate 410 includes a transparent substrate 411, and a transparent electrode 412 formed on a top surface of the transparent substrate 411. A transparent portion 413 is formed on a top surface of the transparent electrode 412. In this embodiment, the transparent portion 413 is formed substantially in a rectangular shape. However, the transparent portion 413 may be formed in various shapes such as a circle, a triangle, an ellipse, a trapezoid, a polygon, an atypical closed figure, etc. Also, an opaque portion 414 may be formed outside the transparent portion 413 on the top surface of the transparent electrode 412 to prevent the light from passing therethrough.

The rollup blade 420 is formed to selectively cover the transparent portion 413 of the base plate 410 and to prevent the light from passing through the transparent portion 413. That is, when no driving force is applied to the rollup blade 420, the rollup blade 420 remains in a rolled up state. When the driving force is applied, the rollup blade 420 is unrolled to cover the transparent portion 413, thereby preventing the light from passing through the transparent portion 413. The rollup blade 420 is formed in two layers, and includes a fixing portion 420*a*, which is fixed to the base plate 410 at a side of the transparent portion 413 and a moving portion 420*b* rolled up toward the fixing portion 420*a* as illustrated in FIG. 8A. Furthermore, the rollup blade 420 may have a plurality of pleats 420c formed at the moving portion 420b perpendicularly to a direction in which the rollup blade 420 is rolled up and unrolled.

The controller 430 applies a voltage to the rollup blade 420 to control the unrolling degree of the rollup blade 420 in various steps.

The structure and operation of the micro shutter 400 according to this exemplary embodiment are substantially the same as those of the micro shutter 100 according to the first embodiment as described above except that one rollup blade 420 closes and opens the transparent portion 413. Therefore, detailed explanations thereof are not repeated.

Figure 9A:
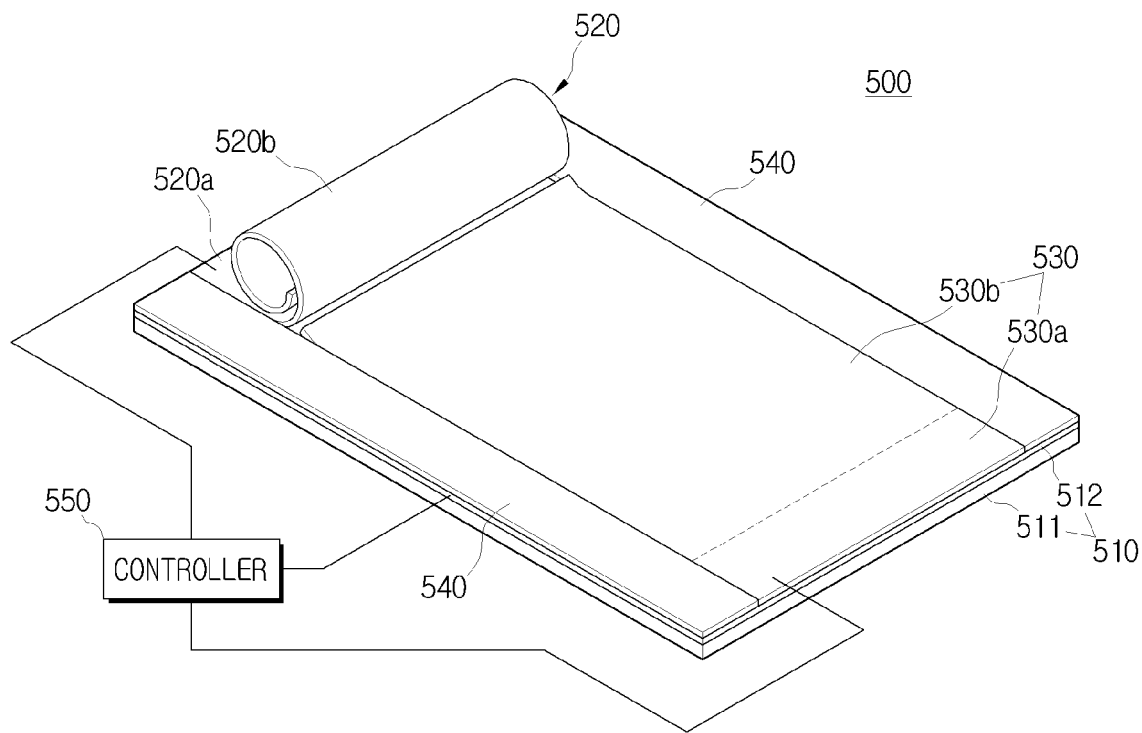
FIGS. 9A to 9C are perspective views illustrating operation of a micro shutter with an iris function according to a fourth exemplary embodiment of the present invention.
Figure 9B:
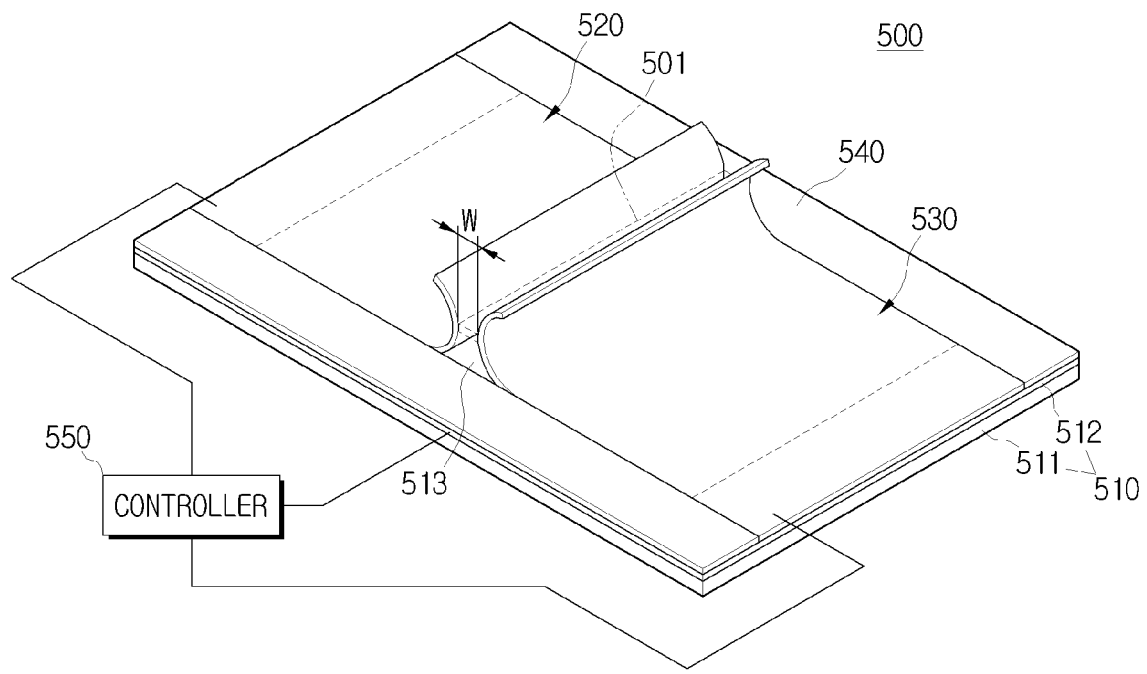
Figure 9C:
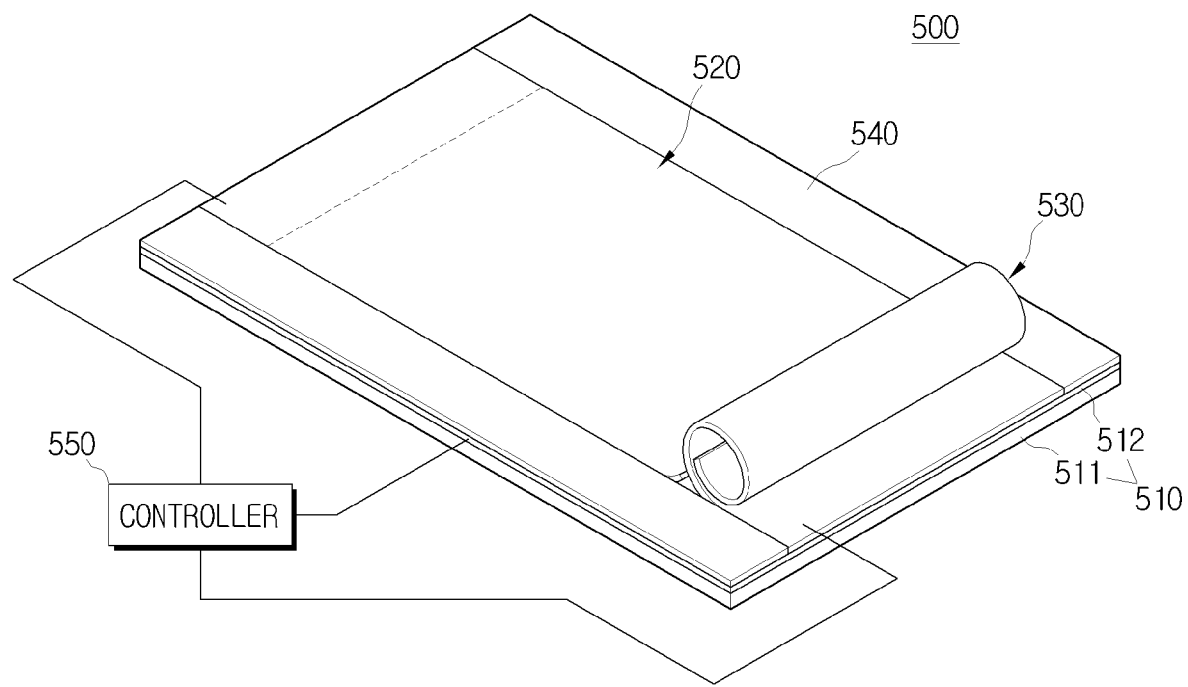

FIGS. 9A to 9C are perspective views illustrating a micro shutter 500 with an iris function according to a fourth embodiment of the present general inventive concept.

Referring to FIGS. 9A to 9C, the micro shutter 500 with an iris function according to the fourth embodiment of the present general inventive concept includes a base plate 510, a pair of rollup blades 520 and 530, and a controller 550.

The base plate 510 includes a transparent substrate 511, and a transparent electrode 512 formed on a top surface of the transparent substrate 511. A transparent portion 513 is formed in a substantially rectangular shape on a top surface of the transparent electrode 512. An opaque portion 540 may be formed outside the transparent portion 513 on the top surface of the transparent electrode 512 to prevent the light from passing therethrough. The structure of the base plate 510 is substantially the same as that of the micro shutter 100 according to the first embodiment; therefore, a detailed description thereof is not repeated.

The pair of rollup blades 520 and 530 is disposed to face each other at opposite sides of the transparent portion 513 on the transparent electrode 512 to cover the transparent portion 513. Each of the pair of rollup blades 520 and 530 has a size to completely cover the transparent portion 513. The structure and operation of the pair of rollup blades 520 and 530 are substantially the same as the rollup blade 120 of the micro shutter 100 according to the first exemplary embodiment; therefore, detailed descriptions thereof are not repeated.

The controller 550 applies a voltage to the pair of rollup blades 520 and 530 to control the unrolling degree of the pair of rollup blades 520 and 530 in various steps. In FIG. 9A, the controller 550 applies the shutter voltage to a right rollup blade 530, and no voltage to a left rollup blade 520. Then, the right rollup blade 530 is unrolled to cover the transparent portion 513 so that the light cannot pass through the transparent portion 513. In FIG. 9C, the controller 550 applies the shutter voltage to the left rollup blade 520, and no voltage to the right rollup blade 530. Then, the left rollup blade 520 is unrolled to cover the transparent portion 513 so that the light cannot pass through the transparent portion 513.

FIG. 9B is a perspective view illustrating operation of the micro shutter 500 according to this exemplary embodiment. The controller 550 applies a predetermined voltage to the pair of rollup blades 520 and 530 so that the pair of rollup blades 520 and 530 does not contact each other and is spaced apart by a predetermined gap W from each other. Then a slit 501 is formed between the pair of rollup blades 520 and 530, and the light can pass through the slit 501. Subsequently, the controller 550 controls the pair of rollup blades 520 and 530 so that the slit 501 moves from a side of the transparent portion 513 to the opposite side thereof That is, when the controller 550 increases the size of the voltage applied to one rollup blade 520 and 530 and decreases the size of the voltage applied to the other rollup blade 530 and 520, the slit 501 moves along the transparent portion 513. Therefore, the micro shutter 500 according to this embodiment can be used as a high-speed slit focal plane shutter.

Figure 10:
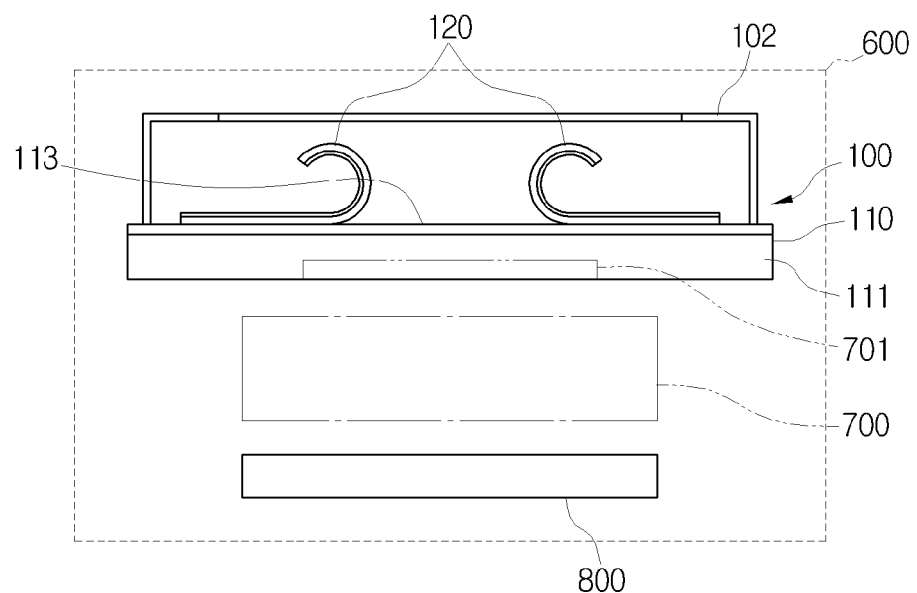
FIG. 10 is a sectional view schematically illustrating a micro camera module with a micro shutter with an iris function according to an exemplary embodiment of the present invention.

FIG. 10 is a sectional view schematically illustrating a micro camera module 600 with a micro shutter 100 with an iris function according to an exemplary embodiment of the present invention.

Referring to FIG. 10, the micro camera module 600 includes the micro shutter 100, a lens unit 700, and an image sensor 800.

The micro shutter 100 operates the plurality of rollup blades 120 to control an amount of the light to enter the image sensor 800, and also can function as an iris as described above. A cover 102 may be disposed at the base plate 110 of the micro shutter 100 to protect the plurality of rollup blades 120. The transparent substrate 111 of the base plate 110 of the micro shutter 100 may be formed integrally with an optical element 701 such as filters, lenses, etc. used to adjust the light having passed through the transparent portion 113.

The lens unit 700 allows the light having passed through the micro shutter 100 to focus at the image sensor 800. Although not illustrated, other lens unit 700 may be disposed above the micro shutter 100.

The image sensor 800 has a plurality of pixels so that a user can take a picture in resolution that the user wants. For example, the image sensors 800 with a range of 2 to 8 mega pixels can be used. Therefore, when the micro shutter 100 according to an embodiment of the present general inventive concept operates, the image sensor 800 forms images that the user wants.

Hereinafter, a method for manufacturing the micro shutter 100 with an iris function according to an embodiment of the present general inventive concept will be explained in detail with reference to FIGS. 11A to 11E. When manufacturing the micro shutter 100 with an iris function according to an exemplary embodiment of the present invention, a wafer level semiconductor fabrication process may be used. FIGS. 11A to 11E illustrate a process of forming only one rollup blade 120 for convenience of explanation.

First, the transparent substrate 111 is prepared. The transparent electrode 112 is formed on the top surface of the transparent substrate 111. A material such as glass, quartz, plastic, silica, etc. can be used as the transparent substrate 111. A material such as indium tin oxide (ITO), electro active polymer, etc. can be used to form the transparent electrode 112.

A sacrificial layer 118 is patterned and formed on the transparent electrode 112. The sacrificial layer 118 may be formed in a shape corresponding to the moving portion 120b of the rollup blade 120. The sacrificial layer 118 may be formed of a material such as photoresist, parylene, plasma enhanced chemical vapor deposition amorphous silicon (PECVD a-Si), poly-silicon (poly-Si), etc.

An insulating layer 121 to serve as the bottom insulating layer of the rollup blade 120 is patterned and formed on a top surface of the sacrificial layer 118. A portion 121a of the insulating layer 121 to serve as the fixing portion 120a of the rollup blade 120 is formed on the transparent electrode 112. The insulating layer 121 may be formed of a material having an optical black property. The insulating layer 121 may be formed of a material such as PECVD, $Si_3N_4$, $SiO_2$, parylene, etc.

Subsequently, an electrode layer 122 to serve as the top electrode layer of the rollup blade 120 is patterned and formed on a top surface of the insulating layer 121. The electrode layer 122 may be formed of a metal or other electrode materials. For example, the electrode layer 122 may be formed of a material such as Cr, Al, Au, Mo, Cu, etc. Also, the electrode layer 122 may be formed of a material having an optical black property. Furthermore, residual stresses of the electrode layer 122 and the insulating layer 121 are appropriately adjusted so that the rollup blade 120 having the insulating layer 121 and the electrode layer 122 can be rolled upwardly by itself.

Figure 11A:
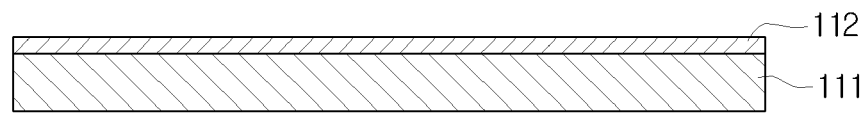
FIGS. 11A to 11E are process views illustrating a process for manufacturing a micro shutter with an iris function according to an exemplary embodiment of the present invention.
Figure 11B:
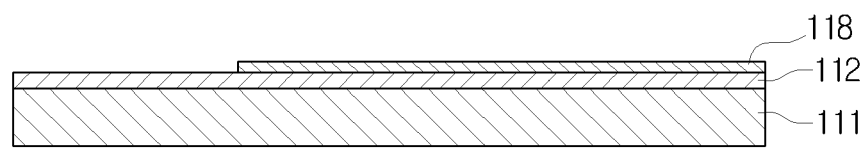
Figure 11C:
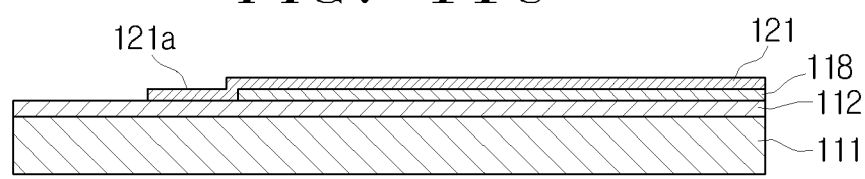
Figure 11D:
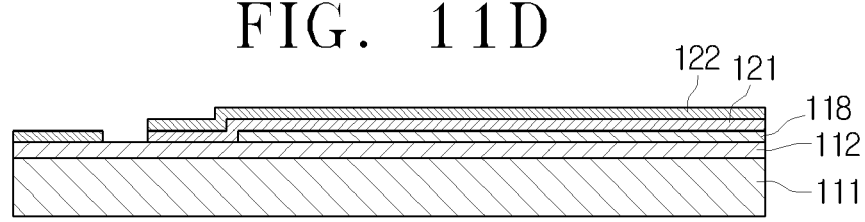
Figure 11E:
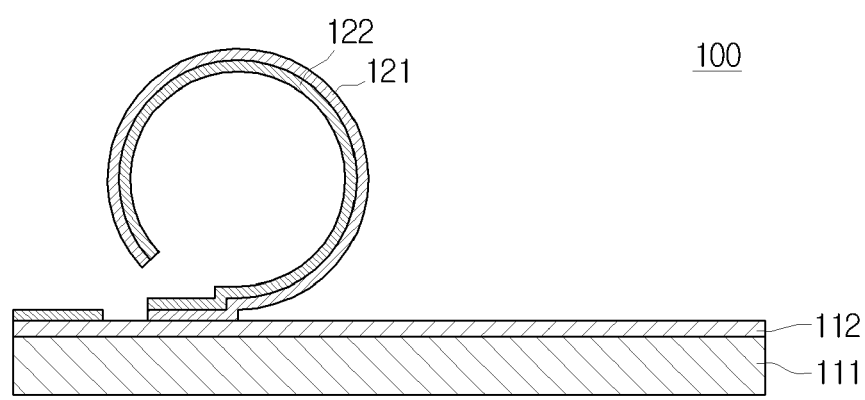

Finally, the sacrificial layer 118 is removed by a plasma etching process, a vapor phase etching process, etc. Then, the insulating layer 121 and the electrode layer 122 forming the rollup blade 120 are rolled by themselves upwardly, that is, in the counterclockwise direction, as illustrated in FIG. 11E, due to the residual stresses thereof When using the wafer level semiconductor fabrication process to manufacture the micro shutter 100, the number of the rollup blades 120 of the micro shutter 100 can be easily adjusted by changing a design of a photo mask in the semiconductor fabrication process. Therefore, the number of the rollup blades 120 of the micro shutter 100 may be easily increased. Also, because of using the semiconductor fabrication process, the manufacture of the micro shutter 100 is easy, and the productivity of the micro shutter 100 is increased. Furthermore, the micro shutter 100 may be manufactured integrally with a wafer level lens array or a wafer level image sensor module.

Although a few exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A micro shutter with an iris function, comprising: a base plate with a transparent portion which allows light to pass through;
   a plurality of rollup blades, which blocks the light, arranged in a regular polygon at a circumference of the transparent portion on the base plate to cover the transparent portion, and each of the plurality of rollup blades has a fixing portion fixed to the base plate and a moving portion rolled up toward the fixing portion; and
   a controller electrically connected with the base plate and the plurality of rollup blades which controls unrolling degrees of the plurality of rollup blades,
   wherein the transparent portion forms a circular shape corresponding to an image sensor,
   wherein each of the plurality of rollup blades comprises;
   an insulating layer which contacts the base plate; and
   a piezoelectric driving layer formed on the insulating layer,
   wherein the piezoelectric driving layer comprises a first electrode layer, a piezoelectric layer, and a second electrode layer, and
   wherein a voltage is applied to the first electrode layer or the second electrode layer so that a piezoelectric driving force is generated in the piezoelectric driving layer, and an electrostatic force is generated between the piezoelectric driving layer and the base plate.

2. The micro shutter with an iris function of claim 1, wherein each of the plurality of rollup blades form a triangle thin film shape.

3. The micro shutter with an iris function of claim 1, wherein the insulating layer and the piezoelectric driving layer have residual stresses different from each other so that the moving portion is rolled up toward the fixing portion.

4. The micro shutter with an iris function of claim 3, wherein the piezoelectric driving layer has a tensile residual stress.

5. The micro shutter with an iris function of claim 1, wherein two nearby rollup blades of the plurality of rollup blades partially overlap each other.

6. The micro shutter with an iris function of claim 5, wherein the plurality of rollup blades comprises at least two layers.

7. The micro shutter with an iris function of claim 1, wherein each of the plurality of rollup blades comprises a plurality of pleats formed perpendicularly to a rolling direction.

8. The micro shutter with an iris function of claim 1, wherein the base plate comprises:
   a transparent substrate; and
   a transparent electrode disposed on the transparent substrate.

9. The micro shutter with an iris function of claim 8, wherein the transparent substrate comprises at least one optical element.

10. The micro shutter with an iris function of claim 1, wherein the controller controls the unrolling degrees of the plurality of rollup blades by at least three steps.

11. The micro shutter with an iris function of claim 1, wherein the controller controls the unrolling degrees of the plurality of rollup blades using a magnetic force.

12. The micro shutter with an iris function of claim 1, further comprising a cover disposed over the plurality of rollup blades on the base plate.

13. A micro shutter with an iris function, comprising:, a base plate with a transparent portion which allows light to pass through;
   a plurality of rollup blades, which blocks the light, arranged in a regular polygon at a circumference of the transparent portion on the base plate to cover the transparent portion, and each of the plurality of rollup blades has a fixing portion fixed to the base plate and a moving portion rolled up toward the fixing portion; and
   a controller electrically connected with the base plate and the plurality of rollup blades which controls unrolling degrees of the plurality of rollup blades,
   wherein the transparent portion forms a circular shape corresponding to an image sensor,
   wherein each of the plurality of rollup blades comprises:
   a piezoelectric driving layer which contacts the base plate; and
   an insulating layer formed on the piezoelectric driving layer,
   wherein the piezoelectric driving layer comprises a first electrode layer, a piezoelectric layer, and a second electrode layer, and
   wherein a voltage is applied to the first electrode layer or the second electrode layer so that a piezoelectric driving force is generated in the piezoelectric driving layer, and an electrostatic force is generated between the piezoelectric driving layer and the base plate.

14. The micro shutter with an iris function of claim 13, wherein each of the plurality of rollup blades form a triangle thin film shape.

15. The micro shutter with an iris function of claim 13, wherein the piezoelectric driving layer and the insulating layer have residual stresses different from each other so that the moving portion is rolled up toward the fixing portion.

16. The micro shutter with an iris function of claim 15, wherein the insulating layer has a tensile residual stress.

17. The micro shutter with an iris function of claim 13, wherein two nearby rollup blades of the plurality of rollup blades partially overlap each other.

18. The micro shutter with an iris function of claim 17, wherein the plurality of rollup blades comprises at least two layers.

19. The micro shutter with an iris function of claim 13, wherein each of the plurality of rollup blades comprises a plurality of pleats formed perpendicularly to a rolling direction.

20. The micro shutter with an iris function of claim 13, wherein the base plate comprises:
 a transparent substrate; and
 a transparent electrode disposed on the transparent substrate.

21. The micro shutter with an iris function of claim 20, wherein the transparent substrate comprises at least one optical element.

22. The micro shutter with an iris function of claim 13, wherein the controller controls the unrolling degrees of the plurality of rollup blades by at least three steps.

23. The micro shutter with an iris function of claim 13, wherein the controller controls the unrolling degrees of the plurality of rollup blades using a magnetic force.

24. The micro shutter with an iris function of claim 13, further comprising a cover disposed over the plurality of rollup blades on the base plate.

25. A micro shutter with an iris function, comprising: a base plate with a transparent portion which allows light to pass through;
 a pair of rollup blades which block the light arranged to face each other at opposite sides of the transparent portion on the base plate, and each of the pair of rollup blades has a fixing portion fixed to the base plate and a moving portion rolled up toward the fixing portion; and
 a controller electrically connected with the base plate and the pair of rollup blades which controls unrolling degrees of the pair of rollup blades, wherein the transparent portion is formed corresponding to an image sensor,
 wherein the controller controls the pair of rollup blades to form a slit, and wherein the slit moves from one side of the transparent portion to the opposite side thereof.

26. The micro shutter with an iris function of claim 25, wherein the rollup blade comprises;
 an insulating layer and an electrode layer having residual stresses different from each other so that the moving portion is rolled up toward the fixing portion.

27. The micro shutter with an iris function of claim 26, wherein one of the insulating layer and the electrode layer has a tensile residual stress.

* * * * *